(12) United States Patent
Sinha et al.

(10) Patent No.: US 11,681,934 B2
(45) Date of Patent: Jun. 20, 2023

(54) SYSTEM AND METHOD FOR DIFFERENTIAL TESTING OF EVOLVING RULES

(71) Applicant: INTERNATIONAL BUSINESS MACHINES CORPORATION, Armonk, NY (US)

(72) Inventors: Saurabh Sinha, Danbury, CT (US); Tara Astigarraga, Fairport, NY (US); Hao Chen, Beijing (CN); Lian Xue Hu, Beijing (CN); Federico Eduardo Carpi, Buenos Aires (AR); Juan Ariel Brusco Cannata, Buenos Aires (AR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 16/858,652

(22) Filed: Apr. 26, 2020

(65) Prior Publication Data
US 2021/0334676 A1    Oct. 28, 2021

(51) Int. Cl.
| | | |
|---|---|---|
| G06F 17/00 | (2019.01) | |
| G06N 5/04 | (2023.01) | |
| G06F 16/23 | (2019.01) | |
| G06F 16/21 | (2019.01) | |
| G06Q 10/10 | (2023.01) | |

(52) U.S. Cl.
CPC .............. *G06N 5/04* (2013.01); *G06F 16/219* (2019.01); *G06F 16/2358* (2019.01); *G06Q 10/10* (2013.01)

(58) Field of Classification Search
CPC ........ G06N 5/04; G06N 5/022; G06F 16/219; G06F 16/2358; G06F 16/27; G06Q 10/10
See application file for complete search history.

(56) References Cited

U.S. PATENT DOCUMENTS

| | | |
|---|---|---|
| 7,305,374 B2 | 12/2007 | Holmes et al. |
| 8,495,572 B2 * | 7/2013 | Bernin ...................... G06F 8/71 717/122 |
| 8,731,983 B2 | 5/2014 | Gudla et al. |

(Continued)

FOREIGN PATENT DOCUMENTS

| | | |
|---|---|---|
| CN | 106445829 A | 2/2017 |
| WO | 2018226895 A2 | 12/2018 |

OTHER PUBLICATIONS

Mell, P. et al., "Recommendations of the National Institute of Standards and Technology"; NIST Special Publication 800-145 (2011); 7 pgs.

(Continued)

*Primary Examiner* — Greta L Robinson
(74) *Attorney, Agent, or Firm* — Intelletek Law Group, PLLC; Gabriel Daniel, Esq.

(57) ABSTRACT

A computer implemented method for testing rules by a computing device including selecting a current version of a rule and prior version of the rule, comparing the prior version of the rule and the current version of the rule to each other to identify a type of change made in the current version of the rule with respect to the prior version of the rule, and testing the prior version of a rule and the current version of the rule using a common data set, the testing being based on the identified type of change. The test result is provided to a user.

17 Claims, 13 Drawing Sheets

(56) References Cited

U.S. PATENT DOCUMENTS

| | | | |
|---|---|---|---|
| 8,756,049 B2 | 6/2014 | Proctor | |
| 9,311,223 B2* | 4/2016 | Bartley | G06F 11/3676 |
| 9,606,903 B2 | 3/2017 | Murugesan | |
| 10,782,960 B2* | 9/2020 | Studer | G06F 8/34 |
| 2005/0096959 A1 | 5/2005 | Kumar et al. | |
| 2008/0244522 A1* | 10/2008 | Bernin | G06F 8/71 |
| | | | 717/122 |
| 2014/0279810 A1 | 9/2014 | Mann et al. | |
| 2015/0212927 A1* | 7/2015 | N'Gum | G06F 11/368 |
| | | | 717/125 |
| 2015/0286556 A1* | 10/2015 | Ellis | G06F 11/3692 |
| | | | 717/125 |
| 2021/0209485 A1* | 7/2021 | Neha | G06F 16/3334 |

OTHER PUBLICATIONS

Astigarraga, T. et al., "Generation of Test Datasets for Guarded Commands"; U.S. Appl. No. 16/818,596, filed May 13, 2020; 69 pgs.

IBM Operational Decision Manager 8.5.1, Tutorial: Debugging a Ruleset; (Date: 1987); 16 pgs.

\* cited by examiner

1. RULEID: <rule_id>
2. WHEN
3.   <condition_1> AND
4.   <condition_2> AND
5.   <assignment_1>
6.   <condition_3> AND
7.   ...
8. THEN INSERT|UPDATE <table>:
9.   <action_1>
10.  <action_2>
11. ...

1. RULEID: rule_008
2. WHEN
3.   WH.SCHEMA.DISPATCH.COUNTRY in ["US", "USA"]
4. THEN INSERT service_billing:
5.   id = WH.SCHEMA.DISPATCH.INCIDENT_ID
6.   start_time = WH.SCHEMA.DISPATCH.START_TIME
7.   service_level = WH.SCHEMA.DISPATCH.SLC
8.   time_category = WH.SCHEMA.DISPATCH.TCAT
9.   country = "US"

1. RULEID: rule_009
2. WHEN
3.   @time(start_time) >= "09:00:00" AND
4.   @time(start_time) <= "17:00:00" AND
5.   @day(start_time) != "Sunday"
6.   country = "US"
7. THEN UPDATE service_billing:
8.   time_category = "Normal"

SYSTEM AND METHOD FOR DIFFERENTIAL TESTING OF EVOLVING RULES

BACKGROUND

Technical Field

The present disclosure generally relates to computer systems, and more particularly, to computer systems that are configured to test rules based on the types of changes to the rules.

Description of the Related Art

The delivery of technology support systems is governed by complex rules that specify the types and scope of services to be delivered and rules for calculating a scope of the services delivered. The rules may be automated via implementations in a rule language, for efficiency.

SUMMARY

Testing the large number of rules that may be associated with a large contract in an efficient manner can be a challenging and time-consuming task because of complex conditions and inter-rule dependencies. In additional, rules are often changed as they are developed. To address this problem, this disclosure describes a system that facilitates efficient rule testing for frequently evolving rules in a sandboxed environment.

A computer implemented method for testing rules by a computing device including selecting a current version of a rule and prior version of the rule, comparing the prior version of the rule and the current version of the rule to each other to identify a type of change made in the current version of the rule with respect to the prior version of the rule, and testing the prior version of a rule and the current version of the rule using a common data set, the testing being based on the identified type of change. The test result is provided to a user. The rule may include a guard part and a command part. The changes to the rules may include additions, deletions, and modifications of the guard part of the rule or a change to the action part of the rule, for example. When the change is an addition or deletion to the guard part of the rule, and the test results do not meet expected test results, that result is flagged for the user. A computing device and a non-transitory computer readable storage medium are also disclosed.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1 is a schematic representation of an example of lines 1-11 of a rule that may be tested in accordance with an embodiment of the disclosure.

FIGS. 2A-2C show an example of rule dependence among rules 008 (FIG. 2A), rule 009 (FIG. 2B), and rule 020 (FIG. 2C) that can be tested in accordance with an embodiment of the disclosure.

DETAILED DESCRIPTION

Overview

Figure 2C:

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Embodiments of the present disclosure generally relate to methods and systems for automatically testing evolving rules. The system automatically identifies which rules have been modified since their last execution and which dependent rules are potentially impacted by the modified rules. The system runs a set of tests on the modified rules and dependent rules that are potentially impacted by the modified rules to determine the impact of the changes to the rules. A rule may be guarded command, which is a programming statement that is guarded by a proposition. The statement can be executed only if the proposition is true. The guarded command has a guard clause, such as a WHEN clause/part, an IF clause/part, a conditions clause/part, or a propositions clause/part, for example, that lists one or more conditions, such as Boolean expressions and/or other suitable expressions that are to be satisfied in order to trigger the rule. The guarded command may also have a command clause/part, such as a THEN clause/part, an actions clause/part, a statements clause/part, for example, that lists one or more actions that are effectuated if the rule is triggered. Actions may include calculations, selections, assignments, insertions, deletions, data manipulations, and/or any other suitable action.

The system identifies changes made to guard part or command part of a modified rule, runs the old and new rule versions on the data used for testing the old rule version, and computes differences between the two outputs. The differences are presented to the user. Unexpected outputs may be flagged for the user. The architecture of and the processes performed by embodiments of the disclosure provide for faster and more reliable evaluation of large numbers of rules that an entity may be subject to. By virtue of the concepts discussed herein a technological improvement in the efficiency and computational accuracy of the computing device is provided in that fewer computing resources and a faster computation of an appropriately configured computing device, for example.

FIG. 1 is a schematic representation of an example of lines 1-11 of a rule 100. The rule 100 in this example is a WHEN-THEN statement, as shown in lines 2 and 8. The rule is a guarded command in which the WHEN part is the guard part and the THEN part is the command part, as discussed above. Line 1 shows the rule metadata, here the rule ID. Lines 3 and 4 provide conditions. The WHEN part (Lines 2-7 in this example) is the guard part, which specifies conditions to be satisfied. Each condition is a boolean expression on a datasource column or a datamodel field. A condition can use a custom function (from a fixed set of functions). The WHEN part can contain assignments to temporary variables that are referenced in subsequent conditions. Other rules may have different numbers of lines defining different numbers of conditions.

The THEN part (Lines 8-10) specifies the actions to be taken if the WHEN conditions are satisfied. For example, it may consist of an INSERT or UPDATE action on a datamodel table. The THEN part may include a set of assignments to fields of the table, for example. Line 5 in this example is an assignment to a temporary variable, which can be used in subsequent conditions. The THEN statement in Line 8, in this example, is to update a table or insert new records into a table, if the conditions are met. Lines 9-11 define the updates to the table fields. Other rules may have different number of lines defining different THEN functions, for example. Datasource Table: WH. SCHEMA.DISPATCH (holds service dispatch data). Datamodel Table: service_billing (holds generated billing items)

FIGS. 2A-2C show examples of rule dependence among rules 202 (FIG. 2A), rule 204 (FIG. 2B), and rule 206 (FIG. 2C). The WHEN part of rule 202 in FIG. 2A includes a datasource Table WH.SCHEMA.DISPATCH in Line 3, which holds service dispatch data, for example. The THEN part includes an insert to datamodel Table service_billing, which holds generated billing items.

A rule $R_2$ is dependent on a rule $R_1$ if $R_1$ writes to a field F and $R_2$ reads that field. For example, rule 204 of FIG. 2B is dependent on rule 202 of FIG. 2A with respect to fields start time in Line 6 and country in Line 9 of rule 202. Rule 206 in FIG. 2C is dependent on rule 202 with respect to fields service_level in Line 7 and country in Line 9 of rule 202. Rule 206 is dependent on rule 204 with respect to field timecategory in Line 8 of rule 204.

In accordance with embodiments of the disclosure, a subset of all the current rules is identified for testing in a sandbox. A sandbox is an isolated testing environment that is completely separate from any deployed systems using the rules. Thus, testing can be performed in the sandbox, using different datasets, with no impact on deployed systems. The subset of rules, which is referred to as "Affected Rules," may contain modified rules and dependent rules, which are dependent on the modified rules. Modified rules are rules that have changed since their last successful execution in the sandbox. Dependent rules are rules that have definition-use dependencies on the modified rules. Differential testing can be done on modified rules along with their dependent rules.

Rules in the Affected Rules subset are then differentially tested by the system based on the type of change to a respective rule. Differential testing is the process running two versions of a rule on the same input data set and comparing the generated outputs. A current version of a modified rule ($R_{new}$) is compared to an old or prior version of the modified rule ($R_{old}$) to identify whether the guard part, such as a WHEN part, or a command part, such as a THEN part, of the rule has been changed. A guard part may be changed in three ways-one or more guard conditions can be added to $R_{new}$ with respect to $R_{old}$, one or more guard conditions can be deleted from $R_{new}$ with respect to $R_{old}$, or one or more guard conditions can be modified in $R_{new}$ with respect to $R_{old}$. If the command part of the rule is changed, then rules dependent on the rule are tested. Different tests are applied to the rules dependent on the change. Users of the rules are provided with the test results for their own analysis. In the test results provided to the user, the differences between the two output sets can be highlighted, using various user-interface designs, to assist the user in checking the differences for correctness.

Example Block Diagram of System

Figure 3:
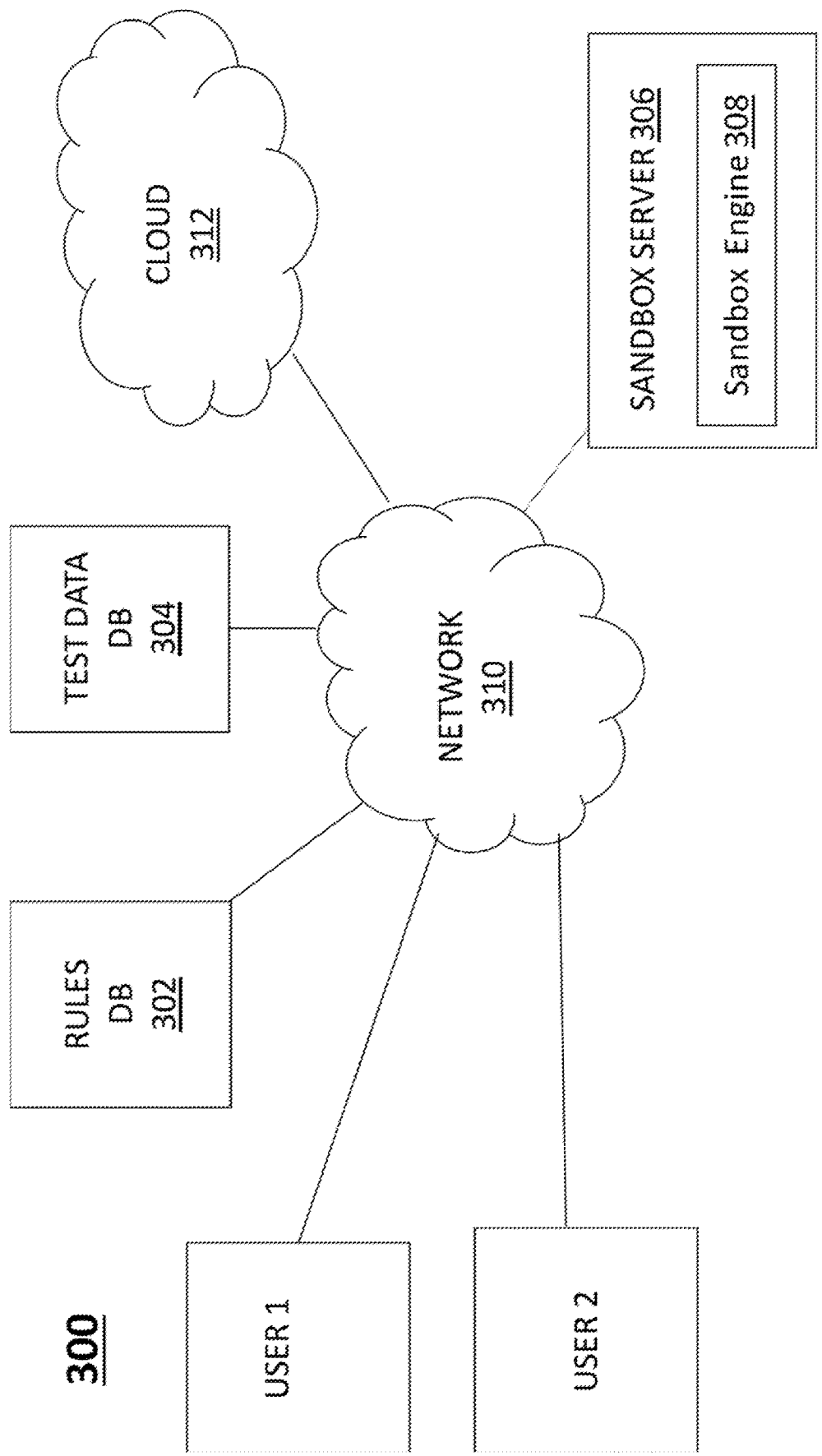
FIG. 3 is a block diagram of an example of a system that is configured to test evolving rules, in accordance with an embodiment of the disclosure.

FIG. 3 is a block diagram of an example of a system 300 that is configured to test evolving rules, in accordance with an embodiment of the disclosure. Two exemplary users, user 1 and user 2 are shown. It is understood that many more users may be present. Users may interact with the system 300 by multiple devices, such as laptop computers, desktop computers, smart-phones, tablet computers, and personal digital assistants (PDAs), although they may be implemented in other form factors, including consumer, medical, and business electronic devices.

The system 300 includes a rules database 302, which includes rules applicable to the user 1 and user 2. A test data database 304 may store data to be used in testing of the rules, as discussed below.

A sandbox server 306 includes a sandbox engine 308 that may retrieve rules from the rules database 302, identify rules that have been changed and how, store the changed (Affected) rules, retrieve test data from the test data database 304, differentially test the changed rules with the test data based on how they were changed, and inform the respective users of the results. In another example, the Affected Rules may be stored in another database external to the sandbox server 306. The rules stored in the rules database 302 and/or the test data stored in the test data database 304 may be stored in another location. It is noted that rules more commonly tested and/or test data more commonly used may be stored in the sandbox engine 308 in addition to or instead of being stored in the rules database 302 and/or the test data database 304.

A network 310 allows the sandbox server 306 to communicate with various resources connected to the network 310, such as the rules database 302 and the test database 304, and to retrieve the needed data from each. The network 310 also allows the sandbox engine 308 to communicate with user 1 and user 2.

While the rules database 302 is shown separate from the test data database 304, the two databases could be combined. In addition, the rules database 302, the test data database 304, and the sandbox server 306 may be implemented by virtual computing devices in the form of virtual machines or software containers that are hosted in the cloud 312, thereby providing an elastic architecture for processing and storage. The cloud 312 is discussed in more detail below.

Example Processes

FIGS. 4-7 present illustrative processes related to various aspects of differential testing of evolving rules in accordance with embodiments of the disclosure. The processes are illustrated as a collection of blocks in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes of FIGS. 4-7 are described with reference to the system 300 of FIG. 3. While at times a WHEN part and a THEN part of a rule are referred to, it should be understood that reference to a WHEN part refers to any type of guard part and reference to a THEN part refers to any type of command part.

Figure 4:
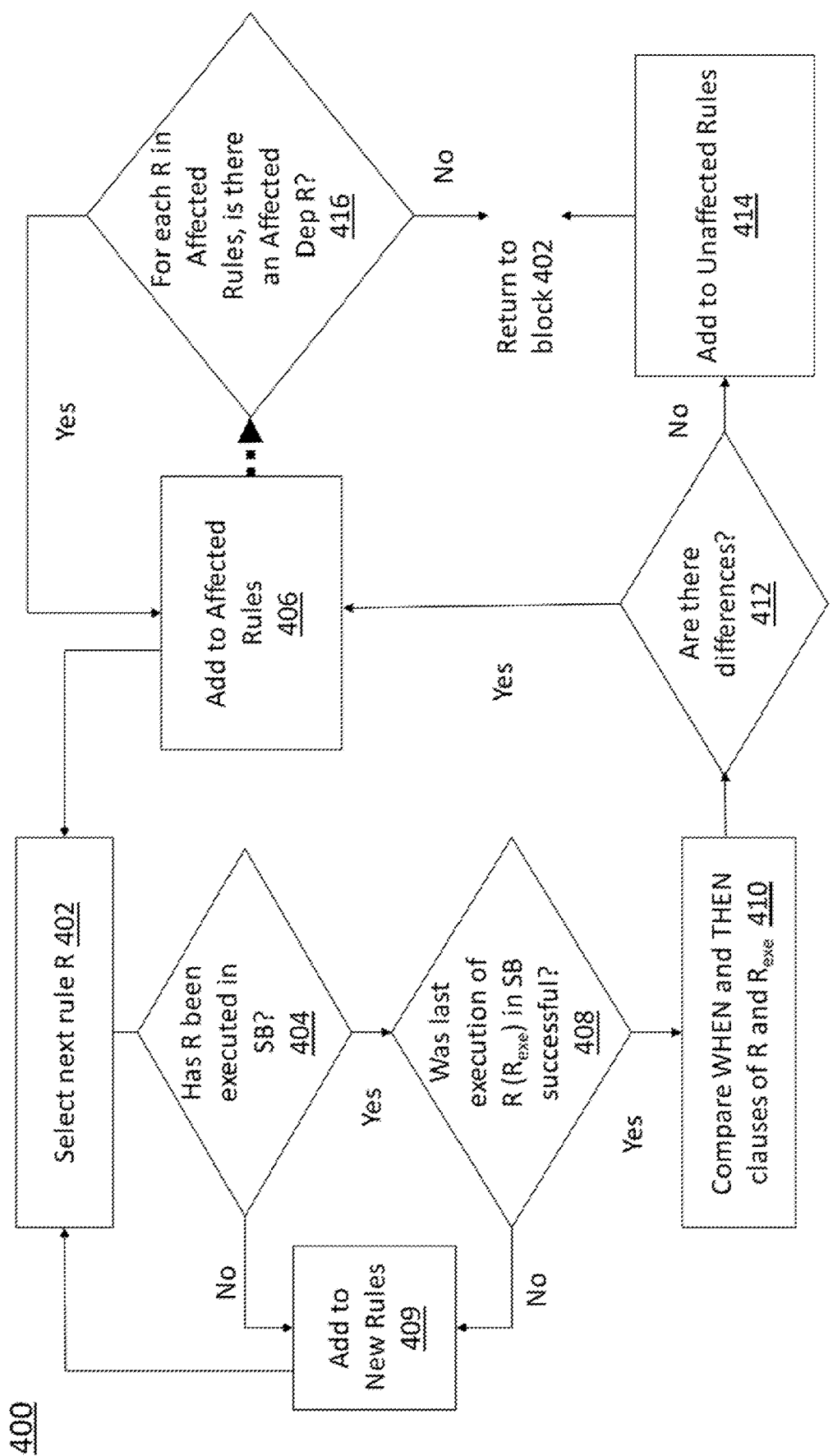
FIG. 4 is a flowchart of an example of a process for selecting rules for testing in the sandbox, in accordance with an embodiment of the disclosure.

FIG. 4 is a flowchart 400 of an example of a process for selecting rules for testing by the sandbox engine 308. In this example, the process is performed by the sandbox engine 308. A rule (or next rule) R is selected, in block 402. Rules may be selected for testing in an order of a predetermined list or randomly, for example. It is determined whether the rule has been previously tested by the sandbox engine 308, in block 404. Whether or not a rule has been previously executed may be determined by checking whether a record exists of a previous execution of the rule. Records of previous executions of rules may be stored by the sandbox engine 308 or in another database in the system 300 of FIG. 3, for example.

If it has been determined that the rule has not been previously executed (No in block 404), the rule R is added to a set of New Rules, in block 409, and the process returns to block 402 to continue to evaluate another rule R. Whether or not a previous execution of a respective rule was successful may be determined based on the records of execution stored by the sandbox engine 308, for example.

If the rule R has been executed (Yes in block 404), it is determined by the sandbox engine 308 whether the last execution the rule R ($R_{exe}$) was successful, in block 408. If the last execution of the rule R by the sandbox engine 308 was not successful (No at block 404), R is treated as a new rule and added to the New Rules set, in block 409. In this embodiment of the disclosure, New Rules are identified for the user but are not further evaluated.

If the sandbox engine 308 determines that the execution of the rule R ($R_{exe}$) was successful (Yes in block 408), the WHEN and THEN parts of the current version of the rule R and the previously executed version of the rule $R_{exe}$ are compared, in block 410. Comparison may be performed by the sandbox engine 308 by a textual comparison of the WHEN and THEN parts, or by constructing expression (parse) trees of the WHEN and THEN parts and comparing the two trees, for example. However, if the sandbox engine 308 determines that the execution of the rule R was not successful (No at block 408), the process continues with block 409, as discussed above.

The sandbox engine 308 determines whether there are differences between the current version of the rule R and the executed version of the rule $R_{exe}$, in block 412, based on the comparison in block 410. If it is determined that there are differences (Yes in block 410), the current version of the rule R is added to the set of Affected Rules, in block 406. The process 400 then returns to block 402 to analyze the next rule R. If it is determined that there are no differences between the current version of the rule R and the previously executed version of the rule $R_{exe}$, then the current version of the rule R is added to a set of Unaffected Rules in block 414, and the flowchart 400 returns to block 402 to analyze the next rule R. The user may be informed of the rules in the set of Unaffected Rules.

As discussed above, rules dependent on Affected Rules may also be analyzed for changes. The flowchart 400 can include the optional block to iteratively determine, for each Affected Rule, whether there is an affected dependent rule, in block 416, as indicated by the broken arrow. As discussed above, a rule $R_2$ is dependent on a rule $R_1$ if $R_1$ writes to a field F and $R_2$ reads that field. Rules meeting that condition may be identified by the sandbox engine 308. The sandbox engine 308 may associate rules with dependent rules for later use. If it is determined that a respective Affected Rule has one or more dependent rules (Yes in block 416), the dependent rule $R_{dep}$ is added to the Affected Rules, in block 406. If it is determined that a respective Affected Rule does not have a dependent rule $R_{dep}$ (No in block 416), the process 400 returns to block 402 to analyze the next rule R.

Figure 5:
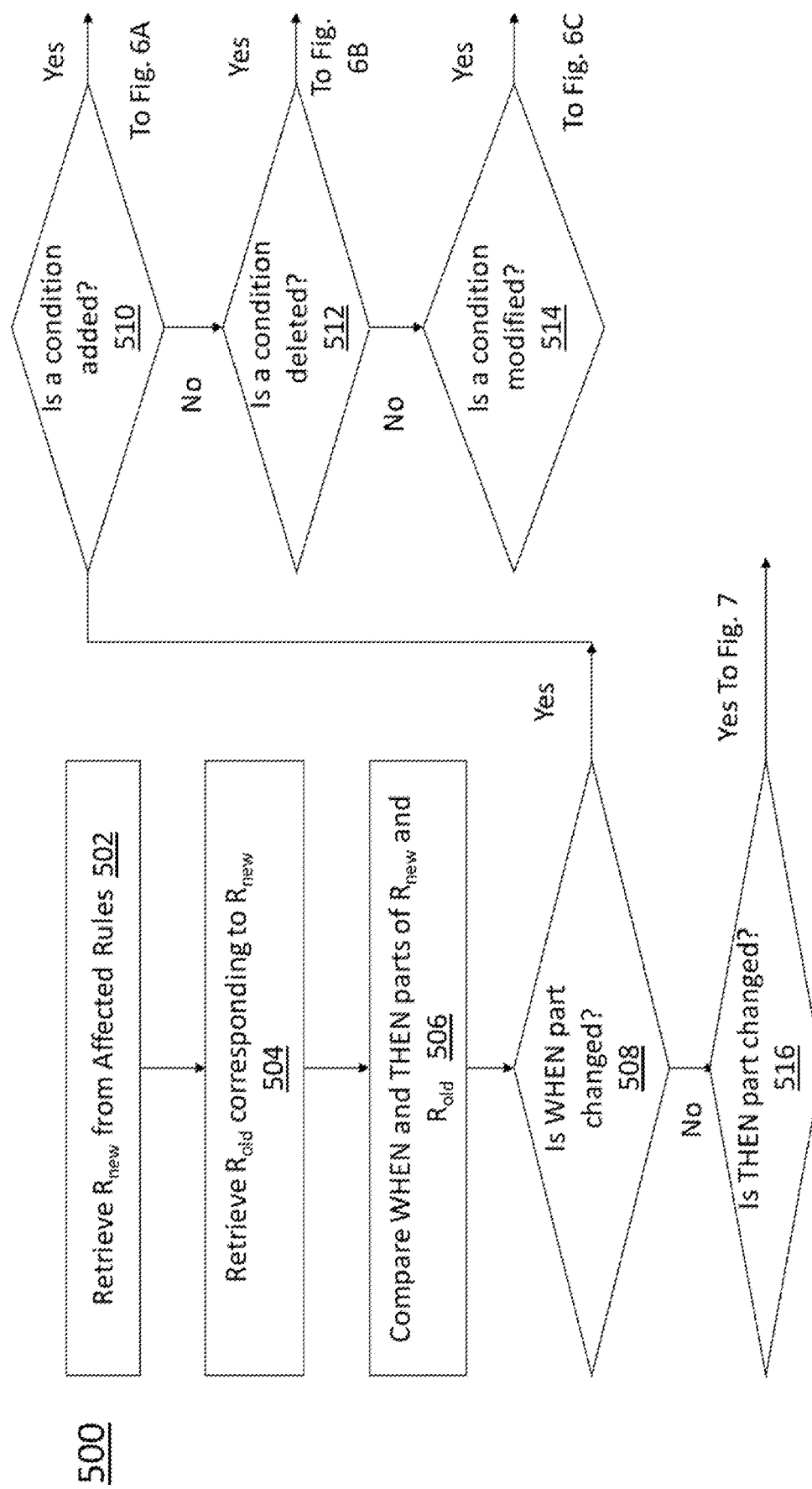
FIG. 5 is a flowchart of an example of a method for determining which test to apply to a respective rule based on the change in the rule, in accordance with an embodiment of the disclosure.

As discussed above, in this example, the rules in the Affected Rules subset are differentially tested by the system based on the type of change to a respective rule. FIG. 5 is a flowchart 500 of an example of a process for determining the test to apply to a respective rule based on the change in the rule, that may be performed by the sandbox engine 308. A new rule $R_{new}$ is retrieved from the set of Affected Rules, in block 502. The new rule $R_{new}$ may be retrieved from the rules database 302 by the sandbox engine 308, for example.

A prior version of the rule $R_{old}$ corresponding to $R_{new}$ is retrieved, in block 504. The prior version of the rule $R_{old}$ may be retrieved from the rules database 302, a database in the sandbox server 306, or a database in the sandbox engine 308, for example, by the sandbox engine 308. The WHEN and THEN parts of $R_{new}$ and the corresponding $R_{old}$ are compared, in block 506. The comparison may be performed by the sandbox engine 308 by textual comparison or by constructing expression (parse) trees of the WHEN part and the THEN part and comparing the two trees as above, for example.

The sandbox engine 308 determines whether the WHEN part of $R_{new}$ is changed with respect to WHEN part of $R_{old}$, in block 508. If the sandbox engine 308 determines that the WREN part is changed (Yes in block 508), the sandbox engine determines whether a condition is added to the WHEN part, in block 510.

Figure 6B:
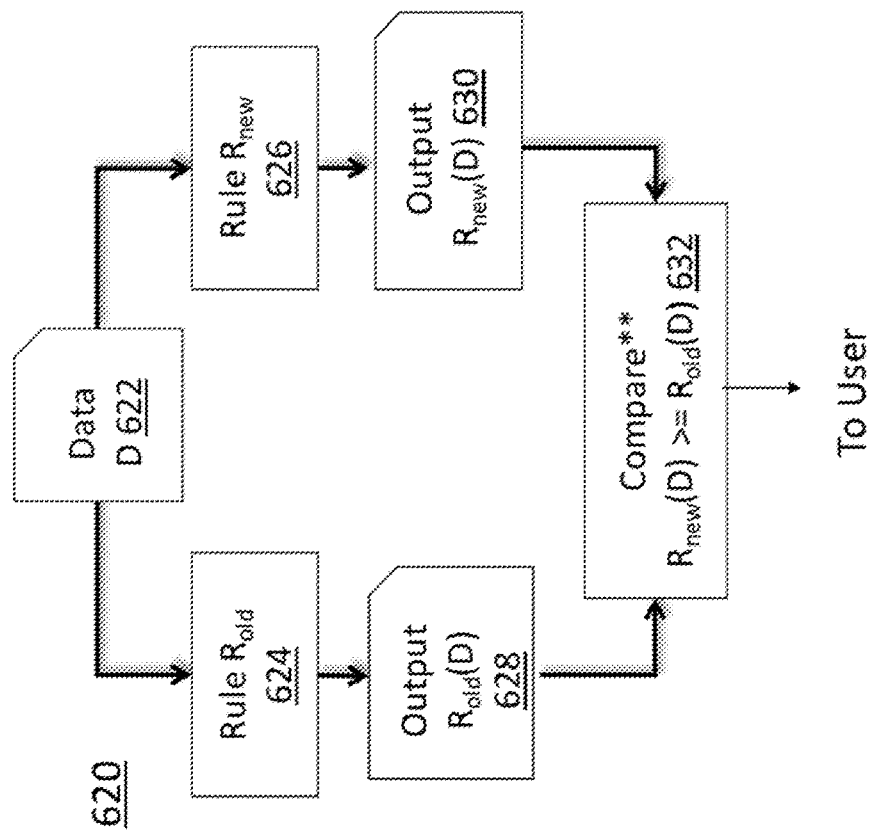
FIGS. 6A-6C are examples of differential testing that may be performed on rules where the WHEN part is added, deleted, or modified, respectively, in accordance with an embodiment.
Figure 6A:
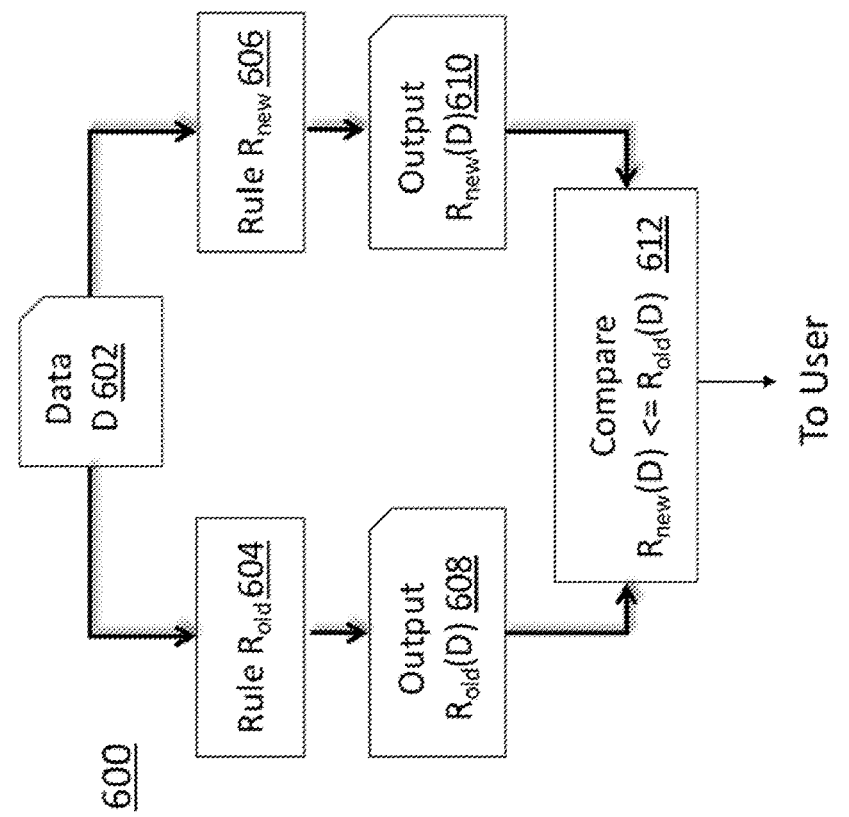

If the sandbox engine 308 determines that a condition is added, in block 510, then the rule $R_{new}$ is tested in accordance with the test of FIG. 6A. If it is determined by the sandbox engine 308 that a condition is not added (No in block 510), the process 500 continues to determine whether a condition is deleted, in block 512. If the sandbox engine 308 determines that a condition was deleted (Yes in block 512), then the rule $R_{new}$ is tested in accordance with the test of FIG. 6B If it is determined by the sandbox engine 308 that a condition is not deleted (No in block 512), the process 500 continues to determine whether a condition is modified, in block 514. If the sandbox engine 308 determines that a condition is modified, in block 514, then the rule $R_{new}$ is tested in accordance with the test of FIG. 6C.

Returning to block 508, if the sandbox engine 308 determines that the WHEN part is not changed (No in block 508), the sandbox engine determines whether the THEN part is changed, in block 516. If the sandbox engine 308 determines that the THEN part is changed, the new rule $R_{new}$ is tested in accordance with FIG. 7.

FIG. 6A is an example of a differential test 600 that may be performed on the old version of the rule $R_{old}$ and the new version of the rule $R_{new}$ when a new WHEN condition is found to be added. Test data is retrieved, in block 602. The test data may be retrieved by the sandbox engine 308 from the test data database 304, for example. The retrieved data set depends on the rule being tested. The user may identify the dataset that should be used with a respective rule for the sandbox engine 308, which may associate the rules and respective datasets in a table, for example. The prior rule $R_{old}$ is run with the test data, in block 604, and the corresponding new rule $R_{new}$ is run with the test data, in block 606. Results are output in blocks 608 and 610, respectively, and compared in block 612.

Since a new condition was added to the prior rule $R_{old}$ to obtain the new rule $R_{new}$, it is expected that there will be fewer successful instances or records of $R_{new}(D)$ than $R_{old}(D)$ ($R_{new}(D) \leq R_{old}(D)$). This is because, for each input record on which the WHEN conditions are met, one or more output records are produced (as new records or updated records). For an input record on which some WHEN condition is not met, no output record is created. The data set includes data that will meet both scenarios, so that the conditions are met on some records and not on others. A "successful instance" is a test of the rule where the conditions are met. Because $R_{new}$ has new conditions added, there will typically be fewer successful instances in $R_{new}$ than in $R_{old}$.

The result of the comparison is sent to the user by the sandbox engine 308. If the result of the comparison for a respective new rule $R_{new}$ is not the expected result, the sandbox engine 308 can flag the result for the user.

FIG. 6B is an example of a test 620 that may be conducted when a WHEN condition is found to be deleted. As in FIG. 6A, test data is retrieved, in block 622. The test data may be retrieved by the sandbox engine 308 from the test data database 304, for example. As above, the dataset may be based on the rule being tested. The prior rule $R_{old}$ is run with the test data, in block 624, and the corresponding new rule $R_{new}$ is run with the test data, in block 626. Results are output in blocks 628 and 630, respectively, and compared in block 632.

Since a condition was deleted from the prior rule $R_{old}$ to obtain the new rule $R_{new}$, it is expected that there will be more successful instances of $R_{new}(D)$ than $R_{old}(D)$ ($R_{new}(D) \geq R_{old}(D)$). The result of the comparison is sent to the user. If the result of the comparison for a respective new rule $R_{new}$ is not the expected result, this can be flagged for the user by the sandbox engine 308.

Figure 6C:
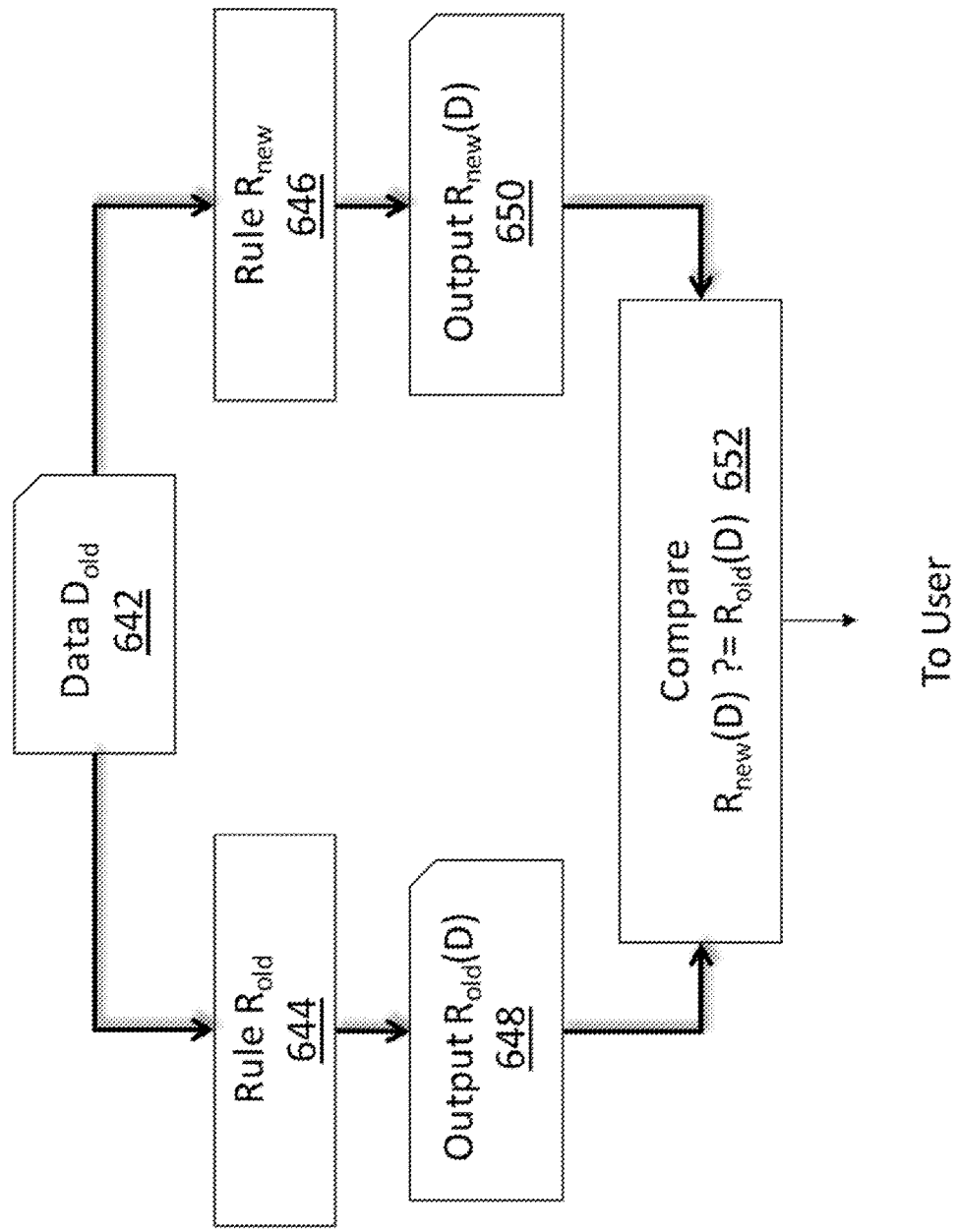
Figure 7:
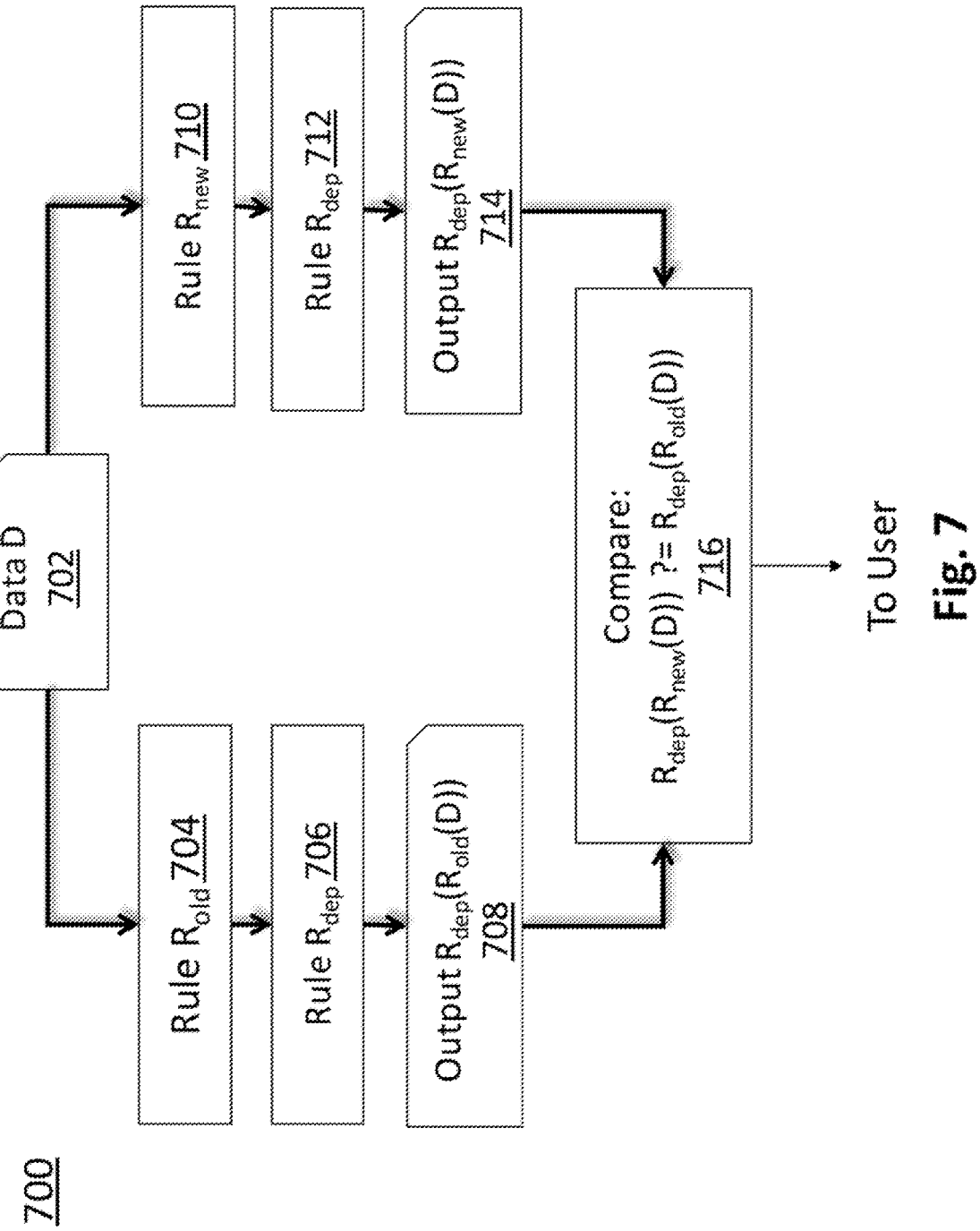
FIG. 7 is an example of a test for comparing old and new versions of a rule when the THEN part is changed, in accordance with an embodiment.

FIG. 6C is an example of a test 640 that may be conducted when a WHEN condition is found to be modified. As in FIGS. 6A and 6B, test data is retrieved, in block 642. The test data may be retrieved by the sandbox engine 308 from the test data database 304, for example. As above, the dataset may be based on the rule being tested. The prior rule $R_{old}$ is run with the test data, in block 644, and the corresponding new rule $R_{new}$ is run with the test data, in block 646. Results are output in blocks 648 and 650, respectively, and compared in block 652.

Since a condition was modified from the prior rule $R_{old}$ to obtain the new rule $R_{new}$, it is not known how whether there will be more, less, or an equal number of instances of $R_{new}(D)$ than $R_{old}(D)$ (($R_{new}(D)$?=$R_{old}(D)$)). The result of the comparison is sent to the user to inform the user whether a respective new version of a rule $R_{new}$ results in greater, fewer, or the same number of successful instances than the prior version of the rule, by the sandbox engine 308.

In each of the examples of FIGS. 6A-6C, if $R_{new}(D)$ is empty, or provides no results, $R_{new}$ and $R_{old}$ may be run with new data. The new data may be provided by the user or may be generated by the sandbox engine 308, as discussed below, for example.

If it is determined that the THEN part of the rule is changed in block 516 of FIG. 5, the change can impact dependent rules. Rules dependent on the rule being considered may have been associated with the respective rule by the sandbox engine 308 with respect to the process 400 of FIG. 4 or may be found by searching the rules for dependent rules prior to running the process 700, in the manner discussed above with respect to the process 400. The combination of the changed rule and the dependent rule are tested as described in FIG. 7, which is an example of a test 700 for comparing old and new versions of a rule when the THEN part is changed.

Test data is retrieved, in block 702. The test data may be retrieved by the sandbox engine 308 from the test data database 304, for example. The prior rule $R_{old}$ is run with the test data, in block 704 and the result is run with the dependent rule $R_{dep}$, in block 706. The output of Output $R_{dep}(R_{old}(D))$ is provided in block 708. The sandbox engine 308 can run the test to generate the output in block 708.

Similarly, the new rule $R_{new}$ is run with the test data, in block 710 and the result is run with the dependent rule $R_{dep}$, in block 712. The output $R_{dep}(R_{new}(D))$ is provided in block 714. The sandbox engine 308 can run the test to generate the output in block 714. It is noted that the same dependent rule $R_{dep}$ may be used with both $R_{old}$ and $R_{new}$, or, due to the change in the THEN part of $R_{new}$, a different dependent rule may be used when conducting this test on $R_{new}$.

The output $R_{dep}(R_{new}(D))$ and the output $R_{dep}(R_{old}(D))$ are compared, in block 716, by the sandbox engine 308. It is not known how whether there will be more, less, or an equal number of instances of $R_{dep}(R_{new}(D))$ or $R_{dep}(R_{old}(D))$ (($R_{dep}(R_{new}(D))$?=$R_{dep}(R_{old}(D))$). The result of the comparison is sent to the user to inform the user whether a respective new version of the rule results in greater, fewer, or the same number of successful instances than the prior version of the rule, by the sandbox engine 308. As above, if $R_{dep}(R_{new}(D))$ is empty, or provides no results, $R_{new}$ and $R_{old}$ may be run with new data provided by the user or generated by the sandbox engine 308, as discussed below, for example.

The test results may be in the form of a set of records stored in a database that the user has access to, for example. The database may be in the sandbox server 306 or it may be a separate database in the system 300 of FIG. 3. The test results may be accessible to the user via a web browser accessible to the user, for example. Alternatively, the test results may be forwarded directly to the user over the network 310, for example.

Example Computer Platform

Figure 8:
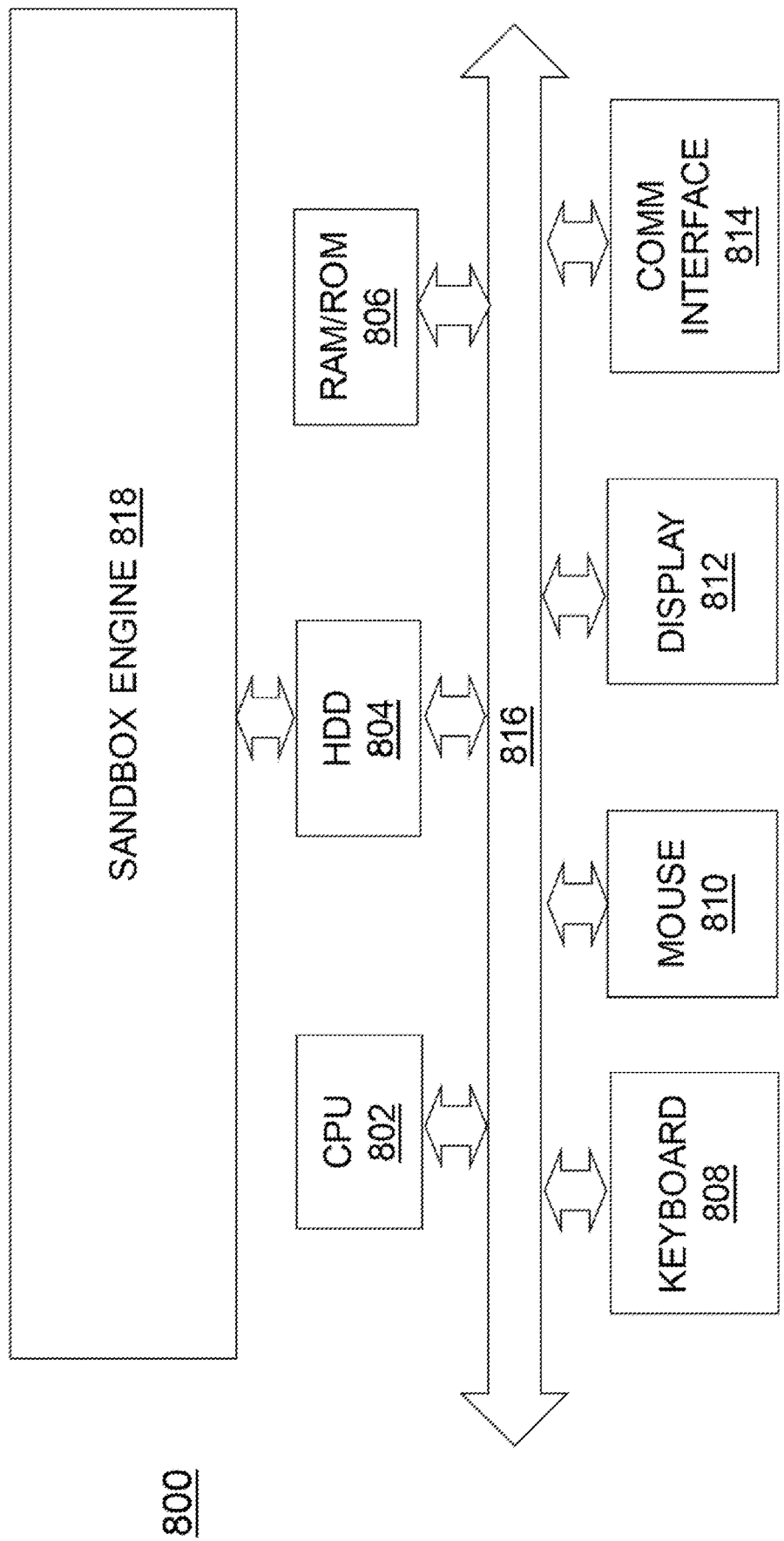
FIG. 8 is an example of a functional block diagram of a computer hardware platform, such as a network or host computer platform, that may be used to implement an appropriately configured server in accordance with an embodiment of the disclosure.

Functions relating to the testing of evolving rules in accordance with embodiments of the disclosure can be performed with the use of one or more computing devices connected for data communication via wireless or wired communication, for example. FIG. 8 is an example of a functional block diagram of a computer hardware platform 800, such as a network or host computer platform, that may be used to implement an appropriately configured server, such as the sandbox server 306 of FIG. 3.

The computer platform 800 may include a processing device, such as a central processing unit (CPU) 802, a hard disk drive ("HDD") 804, random access memory ("RAM") and read only memory ("ROM") 806, a keyboard 808, a mouse 810, a display 812, and a communication interface 814, which are connected to a system bus 816, for example.

A sandbox engine program 818 that corresponds to the sandbox engine 308 of FIG. 3, can execute various processes in a manner described herein. The sandbox engine 818 may be stored in a non-transitory computer readable storage medium, such as the HDD 804, for example.

Figure 9:
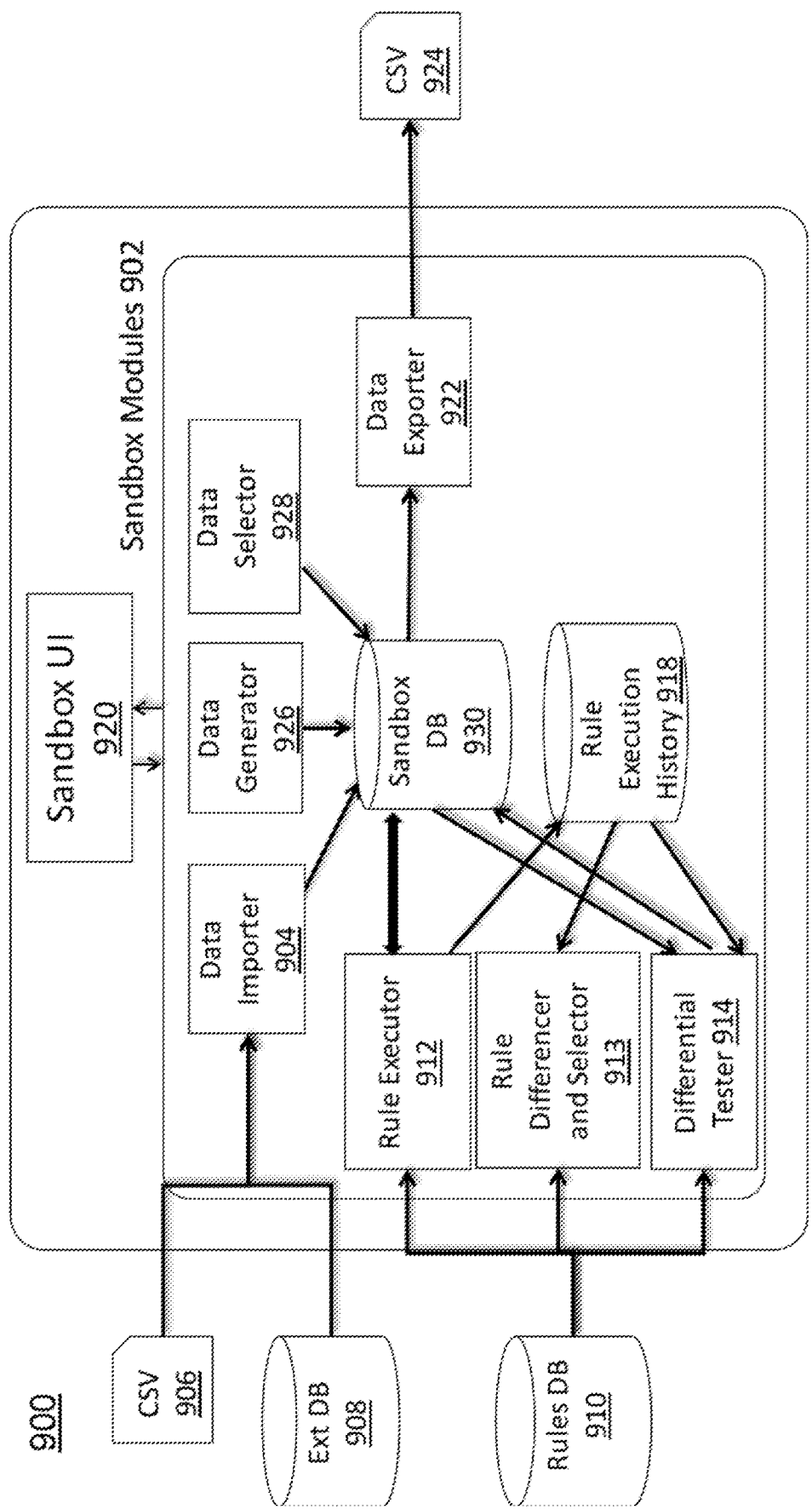
FIG. 9 is an example of a block diagram of a sandbox engine program, in accordance with an embodiment of the disclosure.

The sandbox engine program 818 may have various modules configured to perform different functions, as shown in FIG. 9. The modules in the sandbox engine 818 may be hardware, software, or a combination of hardware and software, for example. Inputs and outputs to the sandbox engine program 818 are also shown in FIG. 9.

FIG. 9 an example of a functional block diagram of a sandbox engine program 900, in accordance with an embodiment of the disclosure. The sandbox engine program 900 includes sandbox modules 902 including a data importer 904 that receives datasets from the test data database 304 (FIG. 3) in the form of a file, such as a common separated value ("CSV") file 906, for example, and from an external database 908, which contains operational data for processing the rules by the sandbox engine 900. The data importer 904 provides the CSV file 906 and the operational data to the sandbox database 930, which maintains the information for retrieval by the other modules.

A rules database 910, such as the rules database 302 of FIG. 3, provides rules to be tested to a rule executor 912, a rule differencer and selector 913, and a differential tester 914. The rule differencer and selector 913 takes as input the two versions of each rule (the old versions and the new versions) and computes the differences in the guard part, such as the WHEN part, and the command part, such as the THEN part, of the rules to identify and select the Affected Rules for testing, as shown in the process 400 in FIG. 4. The rule differencer and selector 913 also implements the process 500 of FIG. 5 to select a test to run on a respective rule. The differential tester 914 instructs the rule executor 912 to perform the selected test on the old and new versions of the rule, as shown in FIGS. 6A-6C and FIG. 7 with the dataset received from the sandbox database 930. The differential tester 914 receives the results from the rule executor 912 and compares the results. The results of the tests run by the rule executor 912 and the results of the comparisons determined by the differential tester 914 are provided to the sandbox database 930.

A rule execution history database 918 in this example stores records of previously executed rules, which are used in the process 400 of FIG. 4 to identify previously executed rules. The rule executor 912 provides records concerning executed rules to the rule execution history database 918, which are retrieved by the rule differencer and selector 913 and the differential tester 914.

A sandbox user interface 920 receives instructions from a user and presents the test results to the user in the form of a web browser, for example. A data exporter 922 may also provide the test results to a user in the form of a file, such as a CSV 924, for example.

The data generator 926 automatically generates synthetic test data relevant for testing a given rule or rules, if needed. In one example, the data generator 926 is configured to generate one or more datasets for testing particular rules by generating a query language query based on a first rule. The query language query is executed on a data table to return one or more datasets for testing the first rule. The query language query can be generated by initializing conditions of a WHERE part of the query language query based on the first rule and transforming the conditions of the WHERE part of the query language query based on a sequence of rules on which the first rule depends, for example. The transformed conditions of the WHERE part of the query language query are converted into query language syntax. Conditions from a guard part of the first rule are inserted into the WHERE part of the query language query. If any variable of any condition in the WHERE part of the query language query is assigned in a guard part of a second rule in the sequence of guarded commands, the variable in the WHERE part of the query language query is replaced with a corresponding assignment specified in the guard part of the second rule. Conditions from a guard part of the second rule are inserted into the WHERE part of the query language query conditions. Duplicate or tautological conditions are removed from the WHERE part of the query language query. Backward traversals on a rule dependence graph are performed to identify a subgraph of rules on which the first rule depends. A topological sort is performed on the subgraph to generate the sequence of rules. One or more datasets are generated that cause all conditions of the WHERE part of the query language query to evaluate true, and one or more datasets are generated that cause the given condition to evaluate false and causes conditions preceding the given condition to evaluate true.

The data selector 928 selects the test data to be used as input for executing a rule. The sandbox database 930 stores test data used as input for rule execution and output created from rule executions and selectively provides the test data to the rule executor 912 for use in testing respective rules, as discussed above. The test data may be provided by the user and/or generated by the data generator 926. The sandbox database 930 also provides test data to the differential tester 914. As discussed above, rules more commonly tested and/or test data more commonly used may be stored in the sandbox engine 308, such as in the sandbox database 930, in addition to or instead of being stored in the rules database 302 and/or the test data database 306.

A program, such as Apache™, can be stored for operating the system as a Web server. In one embodiment, the HDD 804 can store an executing application that includes one or more library software modules, such as those for the Java™ Runtime Environment program for realizing a JVM (Java™ virtual machine).

Example Cloud Platform

As discussed above, functions relating to evaluating evolving rules may include a cloud 312, as shown in FIG. 3. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
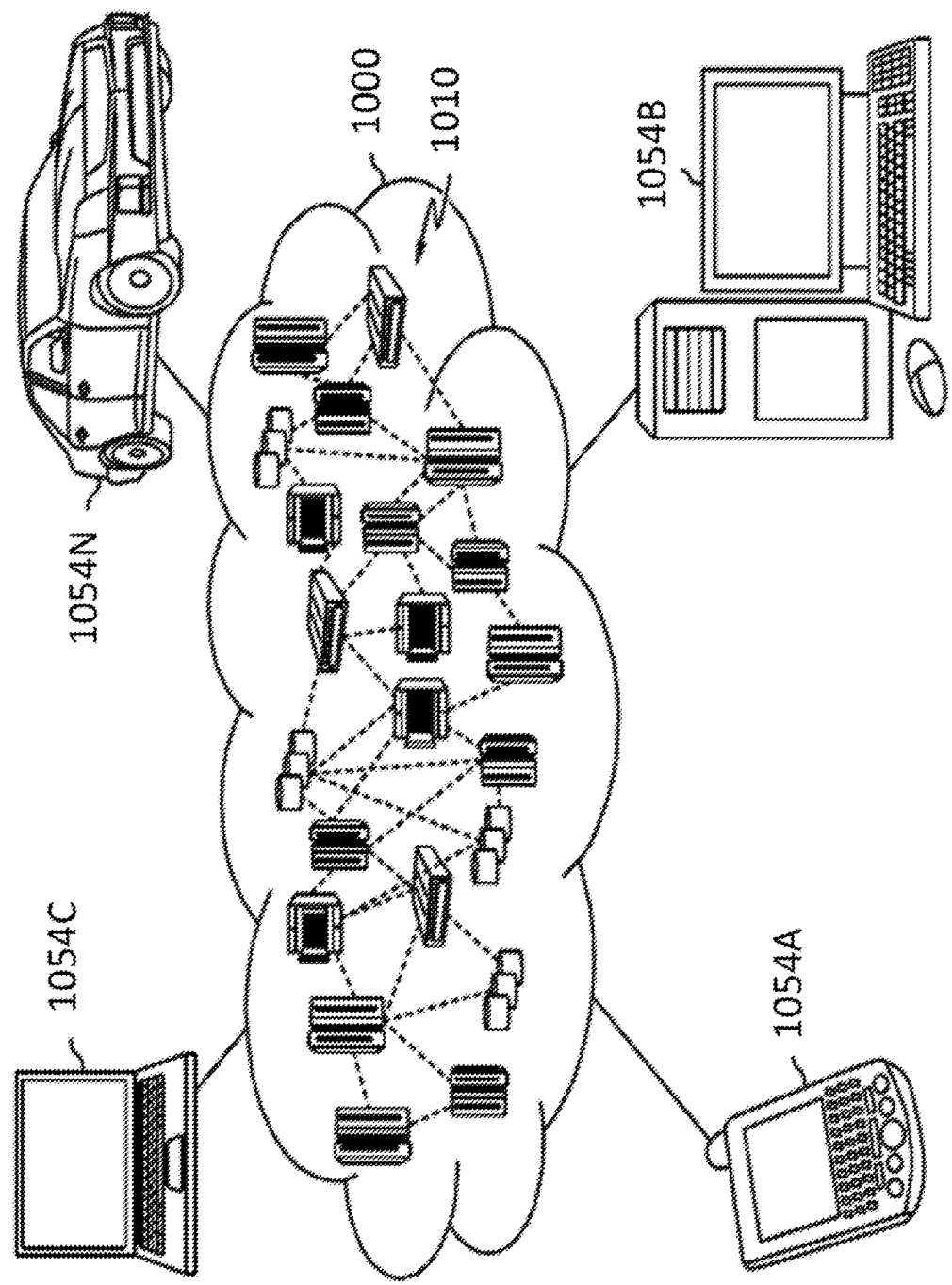
FIG. 10 is an illustrative cloud computing environment in which embodiments of the disclosure may be implemented.

Referring now to FIG. 10, an illustrative cloud computing environment 1000 is depicted. As shown, cloud computing environment 1000 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1000 can communicate with any type of computerized device over any type of network and/or network addressable connection (e.g., using a web browser).

Figure 11:
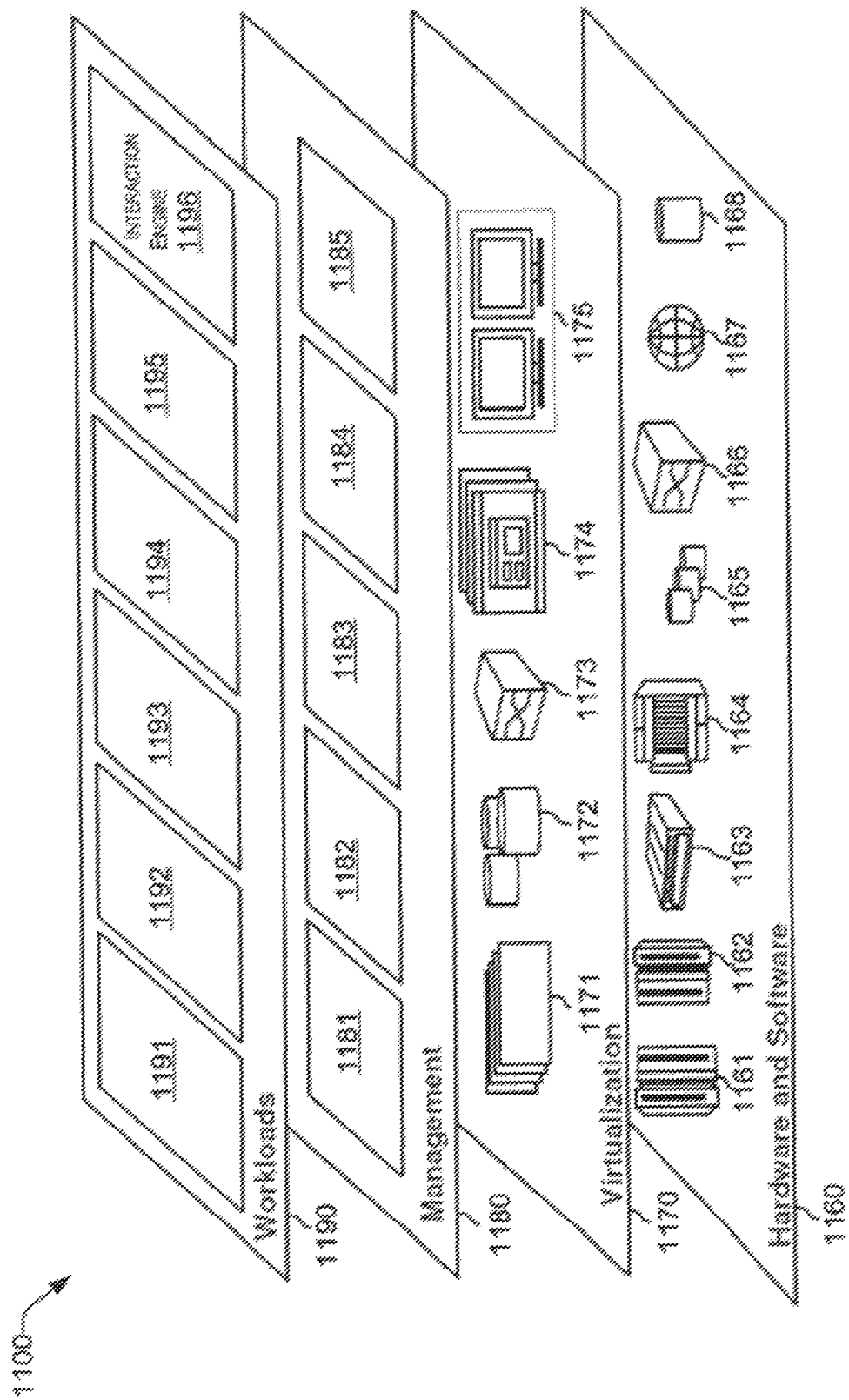
FIG. 11 is a set of functional abstraction layers provided by the cloud computing environment of FIG. 10.

Referring now to FIG. 11, a set of functional abstraction layers provided by cloud computing environment 1000 of FIG. 10 is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172;

virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and interaction engine 1196, such as the sandbox engine 308 of FIG. 6 and the sandbox engine program 818 FIG. 8, to evaluate changes in evolving rules and inform users or the changes.

Conclusion

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, blocks, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, blocks, features, objects, benefits, and advantages. These also include embodiments in which the components and/or blocks are arranged and/or ordered differently.

Aspects of the present disclosure are described herein with reference to call flow illustrations and/or block diagrams of a method, apparatus (systems), and computer program products according to embodiments of the present disclosure. It will be understood that each block of the flowchart illustrations and/or block diagrams, and combinations of blocks in the call flow illustrations and/or block diagrams, can be implemented in hardware, software, or a combination thereof. In the context of software, the blocks represent computer readable and executable program instructions that, when executed by one or more processors, perform the recited operations. Generally, computer executable instructions may include routines, programs, objects, components, data structures, and the like that perform functions or implement abstract data types.

These computer readable and executable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the call flow process and/or block diagram block or blocks.

The computer readable program instructions may be stored in a non-transitory computer readable storage medium, which may be a tangible device that can retain and store instructions for use by an instruction execution device. The computer readable storage medium may be, for example, but is not limited to, a magnetic storage device an optical storage device, an electromagnetic storage device, or any suitable combination of the foregoing. A non-exhaustive list of more specific examples of a computer readable storage medium includes the following: a portable computer diskette, a hard disk, a random access memory (RAM), a read-only memory (ROM), an erasable programmable read only memory (EPROM or Flash memory), a static random access memory (SRAM), a portable compact disc rad-only memory (CD-ROM), a digital versatile disk (DVD), a memory stick, a floppy disk, a mechanically encoded device such as punch-cards or raised structure in a groove having instructions recorded thereon, and any suitable combination of the foregoing. A computer readable storage medium, as used herein is not to be construed as being transitory signals per se. such as radio waves or freely propagating electromagnetic waves, electromagnetic waves propagating through a waveguide or other transmission media (e.g., light pulses passing through a fiber-optic cable), or electrical signals transmitted through a wire.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. Blocks of the flowcharts can be implemented by hardware, software, or a combination thereof. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, block, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for testing rules by a computing device, comprising:
    selecting a current version of a rule and prior version of the rule wherein the rule includes a guard part and a command part;
    comparing the prior version of the rule and the current version of the rule to each other to identify a type of change made in the current version of the rule with respect to the prior version of the rule;
    testing the prior version of the rule and the current version of the rule using a data set, the test being based on the identified type of change;
    determining whether the type of change is an addition of a condition, a deletion of a condition, or a modification of a condition to a guard part of the current version of the rule with respect to the prior version of the rule; and
    providing a result of the test to a user.

2. The computer implemented method of claim 1, wherein, when the change is determined to be an addition to the guard part of the current version of the rule with respect to the prior version of the rule, an expected result of the testing is fewer instances from running the data set on the new version of the rule than from running the data set on the new version of the rule, the method further comprising:
    comparing the result of the testing to an expected result of the testing; and
    flagging the result of the testing for the user if it is determined that the expected result is not met.

3. The computer implemented method of claim 1, wherein, when the type of change is a deletion to the guard part of the current version of the rule with respect to the prior version of the rule, an expected result of the testing is more instances resulting from running the data set on the new version of the rule than resulting from running the data set on the prior version of the rule, the method further comprises:
    comparing the result of the differential testing to the expected result of the testing; and
    flagging the result of the testing for the user if it is determined that the expected result is not met.

4. The computer implemented method of claim 1, the method further comprising:
    determining whether the type of change is to the command part of the current version of the rule;
    identifying a first dependent rule dependent on the prior version of the rule;
    identifying a second dependent rule dependent on the current version of the rule; and
    testing the prior version of the rule and the first dependent rule and testing the current version of a rule and the second dependent rule, using the data set.

5. The computer implemented method of claim 4, wherein the first dependent rule and the second dependent rule are the same.

6. A computer implemented method for testing rules by a computing device, comprising:
    selecting a current version of a rule and prior version of the rule wherein the rule includes a guard part and a command part;
    comparing the prior version of the rule and the current version of the rule to each other to identify a type of change made in the current version of the rule with respect to the prior version of the rule;

testing the prior version of the rule and the current version of the rule using a data set, the test being based on the identified type of change;

comparing a current version of the rule and a prior version of the rule to determine whether the guard part or the command part of the current version of the rule is changed with respect to the prior version of the rule;

selecting the current version of the rule from a set of rules in which the guard part of the current version of the rule or the command part of the current version of the rule is changed with respect to the prior version of the rule; and providing a result of the test to a user.

7. A computing device comprising:
a processing device;
a storage device coupled to the processing device;
sandbox testing engine code stored in the storage device, wherein execution of the code by the processing device causes the computing device to:
select a current version of a rule and prior version of the rule;
compare the prior version of the rule and the current version of the rule to each other to identify a type of change made in the current version of the rule with respect to the prior version of the rule;
determine whether the type of change is an addition of a condition, a deletion of a condition, or a modification of a condition to the guard part of the current version of the rule with respect to the prior version of the rule;
test the prior version of a rule and the current version of the rule using a common data set, the testing being based on the identified type of change; and
provide a result of the test to a user.

8. The computing device of claim 7, wherein, when the change is determined to be an addition to the guard part of the current version of the rule with respect to the prior version of the rule, an expected result of the test is fewer instances from running the data set on the new version of the rule than from running the data set on the new version of the rule, and execution of the code by the processing device further causes the computing device to:
compare the result of the test to expected results of the testing; and
flag the result of the testing for the user if it is determined that the expected result is not met.

9. The computing device claim 7, wherein, when the type of change is a deletion to the guard part of the current version of the rule with respect to the prior version of the rule, an expected result of the test is more instances resulting from running the data set on the new version of the rule than resulting from running the data set on the prior version of the rule, and execution of the code by the processing device further causes the computing device to:
compare the result of the test to expected result of the testing; and
flag the result for the user if it is determined that the expected result is not met.

10. The computing device claim 7, wherein when it is determined that the type of change is to the command part of the current version of the rule, execution of the code by the processing device further causes the computing device to:
identify a first dependent rule dependent on the prior version of the rule;
identify a second dependent rule dependent on the current version of the rule; and test the prior version of the rule and the first dependent rule and test the current version of a rule and the second dependent rule, using the data set.

11. The computing device of claim 10, wherein the first dependent rule and the second dependent rule are the same.

12. The computing device claim 7, wherein execution of the code by the processing device further causes the computing device to select the current version of the rule by:
comparing a current version of the rule and a prior version of the rule to determine whether the guard part or the command part of the current version of the rule is changed with respect to the prior version of the rule; and
selecting the current version of the rule from a set of rules in which the guard part of the current version of the rule or the command part of the current version of the rule is changed with respect to the prior version of the rule.

13. A non-transitory computer readable storage medium tangibly embodying a computer readable program code having computer readable instructions that, when executed, causes a computing device to test rules by:
selecting a current version of a rule and prior version of the rule including a guard part and a command part;
comparing the prior version of the rule and the current version of the rule to each other to identify a type of change made in the current version of the rule with respect to the prior version of the rule;
determine whether the type of change is an addition of a condition, a deletion of a condition, or a modification of a condition to a guard part of the current version of the rule with respect to the prior version of the rule;
testing the prior version of a rule and the current version of the rule using a common data set, the testing being based on the identified type of change; and
providing a result of the test to a user.

14. The non-transitory computer readable storage medium of claim 13, wherein, when the change is determined to be an addition to the guard part of the current version of the rule with respect to the prior version of the rule, an expected result is fewer instances from running the data set on the new version of the rule than from running the data set on the new version of the rule, and execution of the computer readable instructions causes the computing device to:
compare the result of the testing to the expected result of the testing; and
flag the result for the user if it is determined that the expected result is not met.

15. The non-transitory computer readable storage medium of claim 13, wherein, when the type of change is a deletion to the guard part of the current version of the rule with respect to the prior version of the rule, an expected result of the testing is more instances resulting from running the data set on the new version of the rule than resulting from running the data set on the prior version of the rule, and execution of the computer readable instructions causes the computing device to:
compare the result of the testing to the expected result of the testing; and
flag the result for the user if it is determined that the expected result is not met.

16. The non-transitory computer readable storage medium of claim 13, wherein execution of the computer readable instructions causes the computing device to:
determine whether the type of change is to a command part of the current version of the rule;
identify a first dependent rule dependent on the prior version of the rule;

identify a second dependent rule dependent on the current version of the rule; and test the prior version of the rule and the first dependent rule and test the current version of a rule and the second dependent rule, using the data set.

17. The non-transitory computer readable storage medium of claim 16, wherein the first dependent rule and the second dependent rule are the same.

* * * * *